US012232490B2

(12) United States Patent
Hamilton

(10) Patent No.: US 12,232,490 B2
(45) Date of Patent: Feb. 25, 2025

(54) AVIAN IMPACT MITIGATION SYSTEM

(71) Applicant: Chad Ryan Hamilton, Rio Rancho, NM (US)

(72) Inventor: Chad Ryan Hamilton, Rio Rancho, NM (US)

(73) Assignee: Chad Ryan Hamilton, Rio Rancho, NM (US)

( * ) Notice: Subject to any disclaimer, the term of this patent is extended or adjusted under 35 U.S.C. 154(b) by 310 days.

(21) Appl. No.: 17/854,471

(22) Filed: Jun. 30, 2022

(65) Prior Publication Data

US 2023/0000067 A1    Jan. 5, 2023

Related U.S. Application Data

(60) Provisional application No. 63/216,816, filed on Jun. 30, 2021.

(51) Int. Cl.
*A01M 29/32* (2011.01)
*E06B 9/00* (2006.01)
*E06B 9/52* (2006.01)

(52) U.S. Cl.
CPC .............. *A01M 29/32* (2013.01); *E06B 9/00* (2013.01); *E06B 9/52* (2013.01); *E06B 2009/005* (2013.01)

(58) Field of Classification Search
CPC ........ E06B 9/52; E06B 2009/005; E06B 9/00; A01M 29/32
See application file for complete search history.

(56) References Cited

U.S. PATENT DOCUMENTS

| | | | |
|---|---|---|---|
| 3,407,550 | A | 10/1968 | Shaw |
| 4,404,778 | A | 9/1983 | Ushimaru |
| 4,736,980 | A | 4/1988 | Eubanks |
| 4,823,859 | A | 4/1989 | Park |
| 4,893,668 | A | 1/1990 | Nomura |
| 4,979,339 | A * | 12/1990 | Jones ...................... B60J 11/00 248/500 |
| 5,024,479 | A | 6/1991 | Bryngelson |
| 5,031,684 | A | 7/1991 | Soong et al. |

(Continued)

FOREIGN PATENT DOCUMENTS

| | | |
|---|---|---|
| AU | 683656 | 11/1997 |
| CA | 2595720 | 12/2008 |

(Continued)

*Primary Examiner* — Abe Massad
(74) *Attorney, Agent, or Firm* — King & Spalding LLP

(57) ABSTRACT

In multiple embodiments, the avian impact mitigation system may generally include a pliable mesh that is disposed vertically in front of a window by attaching to a building and hanging down from the attachment points. In some embodiments, the system also includes one or more weighted masses that are attached to a bottom portion of the pliable mesh via one or more deformable members. In many embodiments, the combination of the one or more weighted masses attached to the pliable mesh by the one or more deformable members allows for a gentle and gradual transference of the bird's kinetic energy to the one or more weighted masses by absorbing and dispersing the kinetic energy to decelerate the bird safely and rebound the bird away from the window without making contact with the window.

19 Claims, 10 Drawing Sheets

(56) References Cited

U.S. PATENT DOCUMENTS

| | | | | |
|---|---|---|---|---|
| 5,097,638 | A | * | 3/1992 | Jones ............... B60J 11/00 215/397 |
| 5,253,444 | A | | 10/1993 | Donoho et al. |
| 5,344,206 | A | | 9/1994 | Middleton |
| 5,392,549 | A | | 2/1995 | Castro |
| 5,425,192 | A | | 6/1995 | Negre |
| 5,495,884 | A | | 3/1996 | Shikler |
| 5,520,364 | A | * | 5/1996 | Bloxson ............. A47G 9/062 248/500 |
| 5,570,734 | A | | 11/1996 | Wu |
| 6,394,172 | B1 | * | 5/2002 | Kessous ............. E06B 9/40 160/264 |
| 6,880,612 | B2 | | 4/2005 | Pylkki et al. |
| 7,195,053 | B2 | | 3/2007 | Pylkki et al. |
| 7,201,208 | B2 | | 4/2007 | Pylkki et al. |
| 7,614,968 | B1 | * | 11/2009 | Davies ............... A63B 63/00 273/400 |
| 7,871,052 | B2 | * | 1/2011 | Baum ................. E04H 4/10 248/500 |
| 7,901,213 | B1 | | 3/2011 | Beno |
| 8,042,598 | B2 | | 10/2011 | Bredemus et al. |
| 9,482,786 | B2 | | 11/2016 | Arkles |
| 9,995,282 | B2 | | 6/2018 | Cryan et al. |
| 10,258,852 | B1 | * | 4/2019 | Walker ............... A63B 69/00 |
| 10,278,379 | B2 | | 5/2019 | Holt et al. |
| 10,334,840 | B2 | | 7/2019 | Hicks |
| 10,410,553 | B2 | * | 9/2019 | Holyfield ........... G09F 17/00 |
| 10,843,961 | B2 | | 11/2020 | Weng et al. |
| 10,871,600 | B2 | | 12/2020 | Theios |
| 2003/0150569 | A1 | | 8/2003 | Pylkki et al. |
| 2003/0173042 | A1 | * | 9/2003 | Haas ................. E06B 9/24 160/350 |
| 2004/0083643 | A1 | * | 5/2004 | Wu .................... A01M 29/32 43/134 |
| 2004/0192129 | A1 | | 9/2004 | McGregor et al. |
| 2004/0198115 | A1 | | 10/2004 | McGregor et al. |
| 2005/0121154 | A1 | | 6/2005 | Pylkki et al. |
| 2006/0148347 | A1 | | 7/2006 | McGregor et al. |
| 2006/0160445 | A1 | | 7/2006 | McGregor et al. |
| 2006/0169426 | A1 | | 8/2006 | McGregor et al. |
| 2007/0034343 | A1 | | 2/2007 | Zahka |
| 2007/0190343 | A1 | | 8/2007 | Arkles |
| 2008/0289780 | A1 | | 11/2008 | McGregor et al. |
| 2010/0223861 | A1 | | 9/2010 | Warwick |
| 2012/0285106 | A1 | | 11/2012 | Donoho |
| 2019/0294016 | A1 | | 9/2019 | Mathew et al. |
| 2020/0281188 | A1 | | 9/2020 | Donoho |
| 2021/0137097 | A1 | | 5/2021 | Henskes et al. |

FOREIGN PATENT DOCUMENTS

| | | |
|---|---|---|
| CA | 2709378 | 1/2012 |
| CA | 2948639 | 12/2015 |
| CA | 2958857 | 2/2016 |
| CA | 2911782 | 5/2017 |
| CN | 105633885 | 6/2016 |
| CN | 105707053 | 6/2016 |
| CN | 105707054 | 6/2016 |
| CN | 105532633 | 8/2016 |
| CN | 106786070 | 5/2017 |
| CN | 107187605 | 6/2017 |
| CN | 107240876 | 10/2017 |
| CN | 107258725 | 10/2017 |
| CN | 107361036 | 11/2017 |
| CN | 107432220 | 12/2017 |
| CN | 105248345 | 2/2018 |
| CN | 107846871 | 3/2018 |
| CN | 107850816 | 3/2018 |
| CN | 105848533 | 4/2018 |
| CN | 108010260 | 5/2018 |
| CN | 108029673 | 5/2018 |
| CN | 108142404 | 6/2018 |
| CN | 108233307 | 6/2018 |
| CN | 108335838 | 7/2018 |
| CN | 108566849 | 9/2018 |
| CN | 108597738 | 9/2018 |
| CN | 105739347 | 11/2018 |
| CN | 108902120 | 11/2018 |
| CN | 109387882 | 2/2019 |
| CN | 110037002 | 7/2019 |
| CN | 110100811 | 8/2019 |
| CN | 110199983 | 9/2019 |
| CN | 110420523 | 11/2019 |
| CN | 110425476 | 11/2019 |
| CN | 107047532 | 1/2020 |
| CN | 110679586 | 1/2020 |
| CN | 107136049 | 5/2020 |
| CN | 110474245 | 10/2020 |
| CN | 111746721 | 10/2020 |
| CN | 11186965 | 11/2020 |
| CN | 112196427 | 1/2021 |
| CN | 112244004 | 1/2021 |
| CN | 112273367 | 1/2021 |
| CN | 112398031 | 2/2021 |
| DE | 19959567 | 6/2001 |
| DE | 10352484 | 6/2005 |
| DE | 102007028543 | 3/2008 |
| DE | 102007008060 | 8/2008 |
| DE | 102007042015 | 3/2009 |
| EP | 1245151 | 10/2002 |
| EP | 1110450 | 3/2004 |
| EP | 1319335 | 12/2006 |
| EP | 2174545 | 7/2017 |
| GB | 2218885 | 11/1989 |
| GB | 2221481 | 2/1990 |
| GB | 2194566 | 7/1990 |
| JP | 3345051 | 11/2002 |
| JP | 6450747 | 1/2019 |
| JP | 6457493 | 1/2019 |
| KR | 20140000284 | 1/2014 |
| KR | 101879763 | 7/2018 |
| KR | 102075252 | 3/2020 |
| KR | 102164051 | 10/2020 |
| KR | 20210044338 | 4/2021 |
| WO | 2002089570 | 11/2002 |
| WO | 2004017730 | 3/2004 |
| WO | 20140181142 | 11/2014 |
| WO | 2017124129 | 7/2017 |
| WO | 2021023607 | 2/2021 |

* cited by examiner

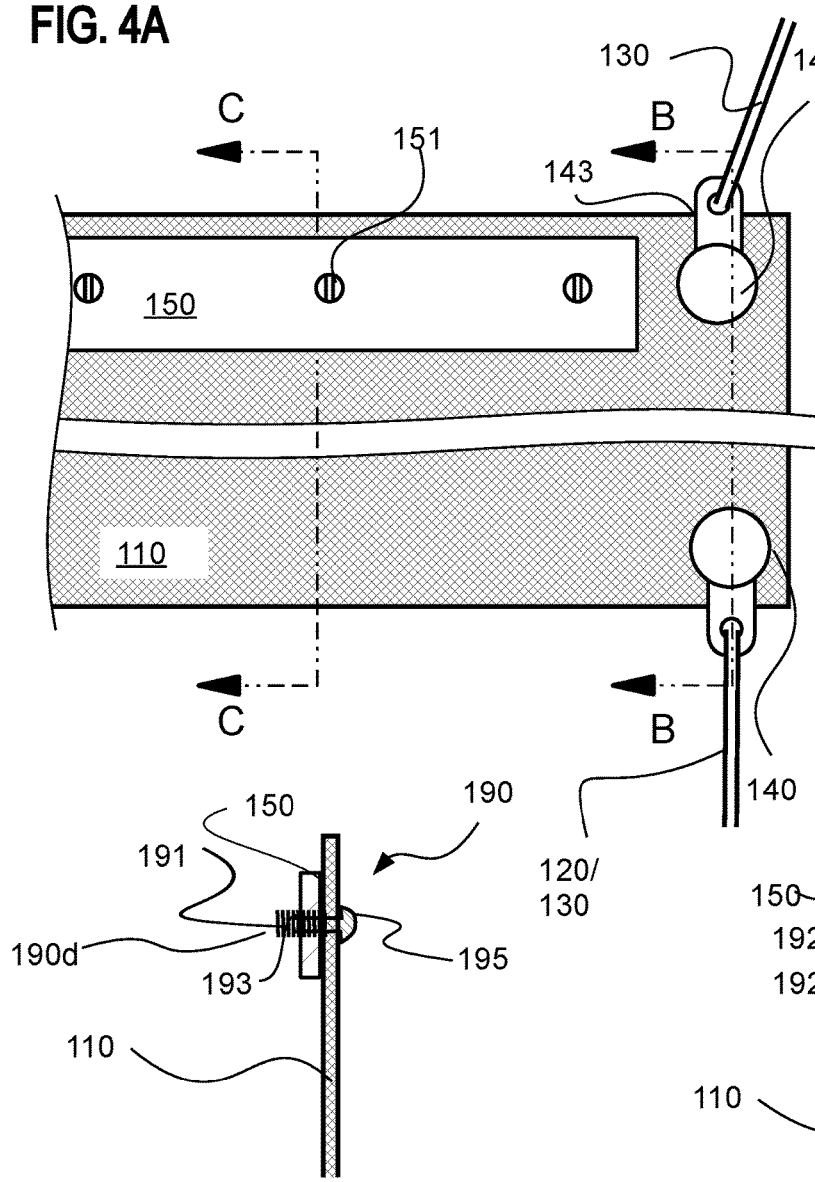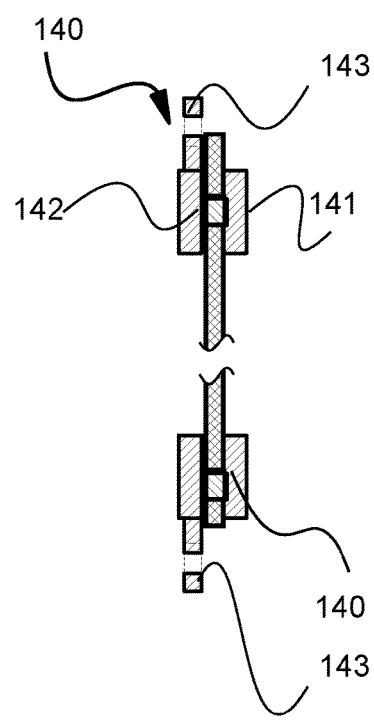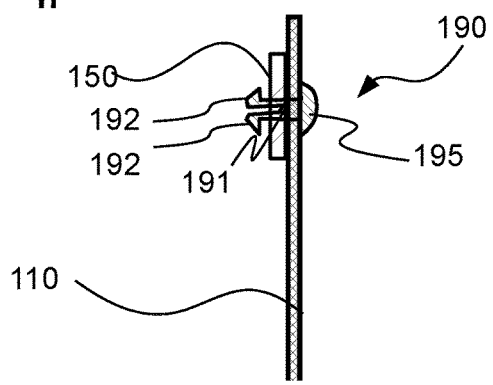

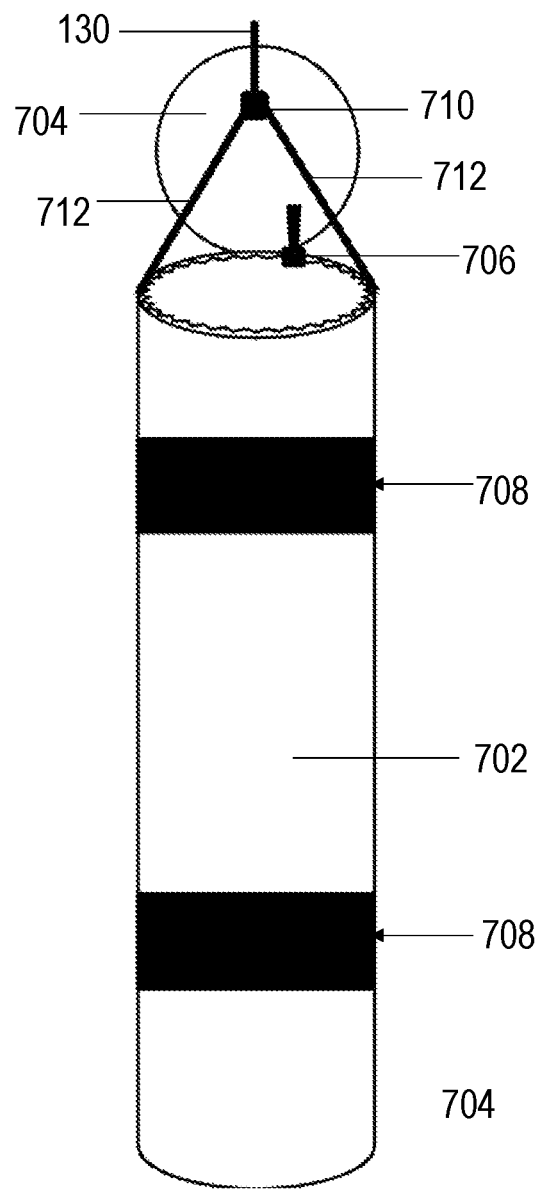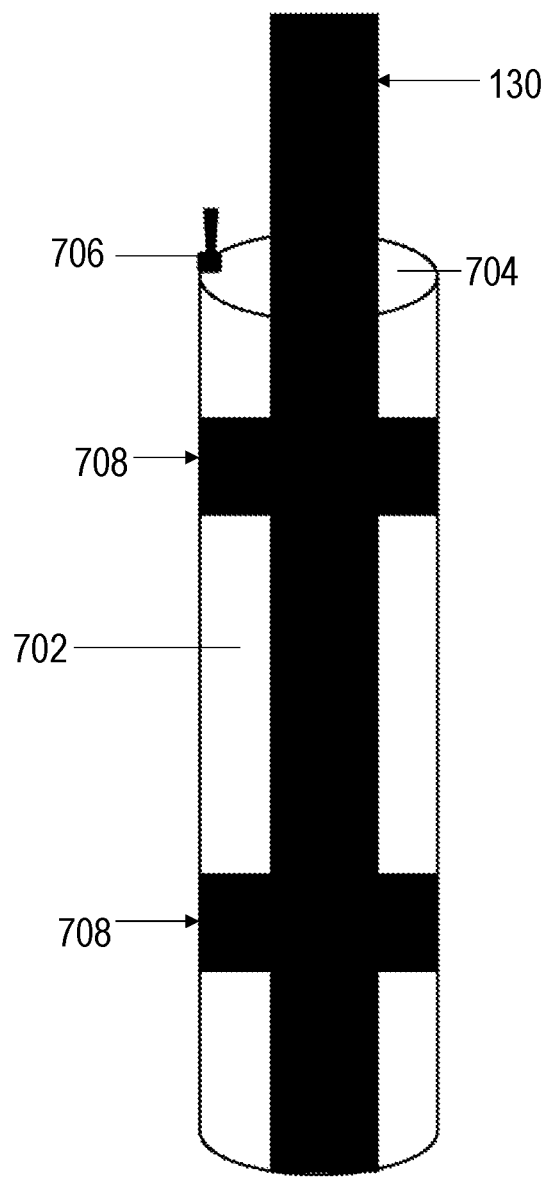
FIG. 7A  FIG. 7B

AVIAN IMPACT MITIGATION SYSTEM

CROSS REFERENCE TO RELATED APPLICATIONS

This application claims the benefit of, and priority to, U.S. Provisional Patent Application. No. 63/216,816, filed on Jun. 30, 2021, and entitled "BIRD SAFE SCREENING FOR WINDOWS AND OTHER STRUCTURES," the disclosure of which is incorporated by reference herein in its entirety.

TECHNICAL FIELD

The present devices and apparatuses relate generally to an avian impact mitigation system, and more particularly to a protective screen to minimize impacts between birds and windows on buildings.

BACKGROUND

Birds of all shapes and sizes travel at speeds high enough that a window collision almost always proves fatal. Birds that survive immediate impact are still stunned and often seriously injured, rendering them extremely vulnerable to predators like domestic cats, soon after a collision, or unable to fly and thus have diminished capacity to find or forage for food, ultimately leading to starvation.

Current solutions to the window-striking issue involve simply hanging a net or screen in front of a window on a residential building. These solutions typically have a static mass attached to the bottom of the screen to weigh the screen down. However, with a static mass attached to the screen, the current solutions may only stop a certain subset of birds from impacting the covered window, depending on the bird's mass and speed at impact. For example, if the static mass is too light, the screen will not prevent any but the smallest of birds or birds flying extremely slowly from impacting the window. However, if the static mass is too heavy, the impact of the bird on the screen may cause prove to be harmful or fatal to most birds, because the heavy static mass pulls the screen tight so that there is no give in the screen when the bird impacts the screen. Additionally, as these screens endure the outside environment, the screens degrade and become less reliable for preventing bird impact events.

These current solutions may also cause damage to the residence due to the static mass repeatedly impacting the residence. In even slightly windy conditions, the wind may cause lighter (by weight) static masses to repeatedly impact the residence, often at about the same location on the residence, which can cause damage over time. Heavier static masses may not repeatedly impact the residence as often as the lighter static masses, but the heavier static masses cause more damage per impact, and in heavy winds, the heavier static masses can cause significant residential damage.

Therefore, there is a long-felt but unresolved need for an avian impact mitigation system that consistently mitigates harm to birds of all sizes and flight speeds when birds impact the system.

BRIEF SUMMARY OF THE DISCLOSURE

According to one aspect, a system comprising: a pliable mesh having a main expanse and suspended relative to a window with the main portion arranged parallel to and offset from a transparent pane of the window; a first deformable member coupled with a first corner of the pliable mesh and extending away from the main expanse; a first weighted mass suspended from the pliable mesh by the first deformable member; a second deformable member coupled with a second corner of the pliable mesh and extending away from the main expanse; and a second weighted mass suspended from the pliable mesh opposite by the second deformable member.

According to another aspect, the system of this aspect or any other aspect, wherein the main expanse of pliable mesh is configured to receive an impact from a bird on a path toward the window.

According to yet another aspect, the system of this aspect or any other aspect, wherein, in response to receiving the impact the main expanse moves toward the transparent pane; and the first weighted mass and the second weighted mass cooperate with the first deformable member and the second deformable member, respectively, to limit the movement of the main expanse toward the transparent pane.

According to yet another aspect, the system of this aspect or any other aspect, wherein the first deformable member and the second deformable member are configured to absorb momentum of the bird transferred to the main expanse via the impact.

According to yet another aspect, the system of this aspect or any other aspect, wherein one or both of the first deformable member or the second deformable members are elastically deformable members such that the first deformable member, or respectively second deformable member, is configured to absorb the momentum of the bird gradually according to an elastic coefficient of a material of the first or second deformable members.

According to yet another aspect, the system of this aspect or any other aspect, wherein the first weighted mass and the second weighted mass define floating anchors for each of the respective first deformable member and the second deformable member, opposite the main expanse.

According to yet another aspect, the system of this aspect or any other aspect, wherein the first weighted mass and the second weighted mass define a counterbalance to the impact from the bird cooperating with the main expanse to maintain at least some offset between the main expanse and the transparent pane during the impact from the bird.

According to yet another aspect, the system of this aspect or any other aspect, further comprising a rigid member fixed to the pliable mesh along an edge of the pliable mesh and extending between the first corner and the second corner.

According to yet another aspect, the system of this aspect or any other aspect, wherein the rigid member is configured to maintain a lateral dimension of the main expanse of pliable meshed during an impact from a bird received by the pliable mesh.

According to yet another aspect, the system of this aspect or any other aspect, wherein a weight of the first weighted mass is supported fully from the first deformable member; and a weight of the second weighted mass is supported fully from the second deformable member.

According to yet another aspect, the system of this aspect or any other aspect, further comprising: a third deformable member coupled with a third corner of the pliable mesh and extending away from the main expanse and fixed to a structure running along the window opposite a ground surface; and a fourth deformable member coupled with a fourth corner of the pliable mesh and extending away from the main expanse and fixed to the structure.

According to yet another aspect, the system of this aspect or any other aspect, wherein the structure comprises a wall, a frame, or sill of a residential or commercial structure.

According to yet another aspect, the system of this aspect or any other aspect, wherein a weight of the system is fully supported and suspended from the structure.

According to yet another aspect, the system of this aspect or any other aspect, wherein the main expanse comprises a generally planar and rectangular shape; and the first, second, third, and fourth corners are separate corners of the rectangular structure.

According to yet another aspect, the system of this aspect or any other aspect, wherein one or more of the first, second, third, or fourth deformable members are formed from a bungee material.

According to yet another aspect, the system of this aspect or any other aspect, wherein the pliable mesh comprises a vinyl coated polyester yarn.

According to yet another aspect, the system of this aspect or any other aspect, wherein the pliable mesh is configured to visually obscure the transparent pain of the window.

According to yet another aspect, the system of this aspect or any other aspect, wherein the pliable mesh has an open area of no greater than about 30%.

According to one aspect, a kit comprising a pliable mesh having a main expanse configured to be suspended relative to a window with the main portion arranged parallel to and offset from a transparent pane of the window; a first deformable member configured to be coupled with a first corner of the pliable mesh and extending away from the main expanse; a first weighted mass configured to be suspended from the pliable mesh by the first deformable member; a second deformable member configured to be coupled with a second corner of the pliable mesh and extending away from the main expanse; and a second weighted mass configured to be suspended from the pliable mesh opposite by the second deformable member.

According to one aspect, a method comprising: suspending a pliable mesh from a structure such that a main expanse of the pliable mesh is arranged relative to a window with the main portion parallel to and offset from a transparent pane of the window; coupling a first deformable member with a first corner of the pliable mesh and allowing the first deformable member to extend away from the main expanse; suspending a first weighted mass from the pliable mesh by the first deformable member; coupling a second deformable member with a second corner of the pliable mesh and allowing the second deformable member to extend away from the main expanse; and suspending a second weighted mass from the pliable mesh by the second deformable member.

The above and other objects, effects, features, and advantages of the present invention will become more apparent from the following description of the embodiments thereof taken in conjunction with the accompanying drawings.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 4A illustrates an enlarged portion of the front view of FIG. 3A, according to one embodiment of the present disclosure;

FIG. 4B illustrates a cross-sectional view at section line B-B in FIG. 4A, according to one embodiment of the present disclosure;

FIG. 4C illustrates a cross-sectional view of section line C-C from FIG. 4A, according to one embodiment of the present disclosure;

FIG. 4D illustrates a cross-sectional view of section line C-C from FIG. 4A, according to one embodiment of the present disclosure; alternative variants of the cross-sectional elevation view at section line C-C in FIG. 4A.

FIG. 7A illustrates a front view of an exemplary sandbag 121a, according to one embodiment of the present disclosure;

FIG. 7B illustrates a back view of an exemplary sandbag 121a, according to one embodiment of the present disclosure;

DETAILED DESCRIPTION

Figure 1:
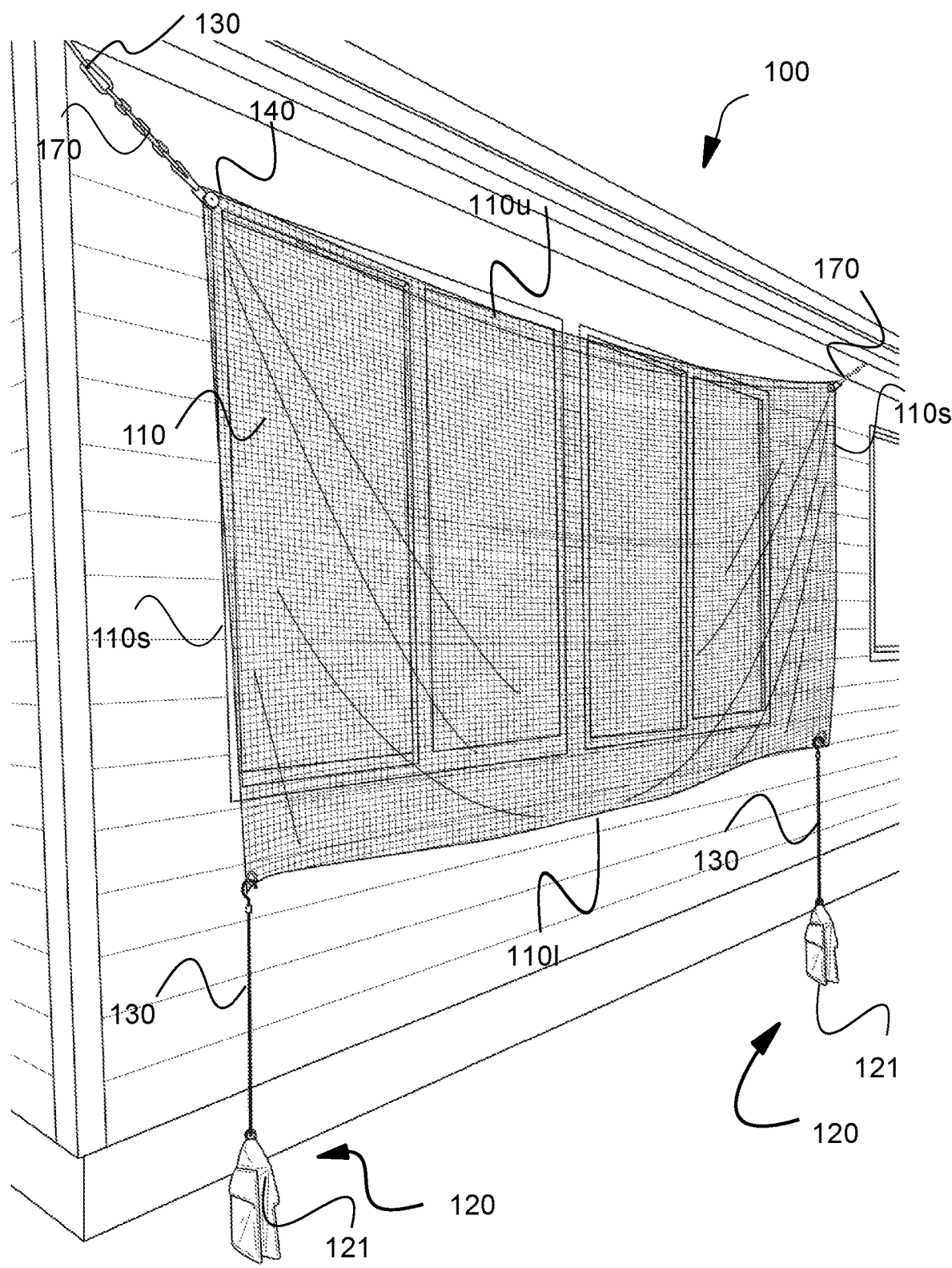
FIG. 1 illustrates a perspective view of an exemplary bird impact mitigation system, according to one embodiment of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Aspects of the present disclosure generally relate to systems and apparatuses for a bird impact mitigation system for use on a building to prevent birds from striking a window of the building. In various embodiments, the bird impact mitigation system may be installed on the outside of a building in front of a window or a plurality of windows. In one or more embodiments, the bird impact mitigation system may be installed so that when a bird flies into the system, the system causes the bird to decelerate completely before striking the window, but does not cause the bird to decelerate so quickly that the bird is harmed.

In multiple embodiments, the bird impact mitigation system may generally include a pliable mesh that has a main expanse disposed vertically in front of, and generally parallel to, a transparent pane of one or more windows by attaching to the building and hanging down from the attachment points. In at least one embodiment, the pliable mesh may be netting or an insect screen, or other similar screens. In a preferred embodiment, the pliable mesh may be a vinyl coated polyester yarn that is pet, puncture, and tear resistant. In some embodiments, the pliable mesh may also obscure reflections from the window glass, which may stop birds from perceiving a reflection of themselves in the glass as a rival bird and attacking the perceived rival bird, which lowers the amount of potential window impacts by birds. In many embodiments, the pliable mesh may have an open area of no greater than about (30%) and openings no larger than about 5 to 10 mm to provide weather resistance and durability. In at least one embodiment, the mesh may be made so as to not obscure the view from the window looking inside or outside. In certain embodiments, larger openings in the mesh can entangle and entrap the head, legs and wings of smaller birds, and thus only protect the structure, while unintentionally creating an additional hazard to the birds by ensnaring them.

In one or more embodiments, the system also includes one or more weighted masses that are attached to a bottom portion of the pliable mesh via one or more deformable members. In many embodiments, the one or more weighted masses are suspended from the pliable mesh so that the one or more weighted masses do not touch the ground when the system is installed on the building. In some embodiments, the one or more deformable members that connect the one or more weighted masses to the pliable mesh are elastic cords or straps, such as bungee cords and the like. In a preferred embodiment, the one or more deformable members are marine polyurethane bungee cords that do not degrade rapidly, as compared to regular bungee cords or steel springs, in the outside environment. Marine bungee cords have metal hooks or ends coated with the cord in a pliable rubber jacket, such as a polyurethane coating to resist corrosion and environmental degradation.

In one or more embodiments, the combination of the one or more weighted masses attached to the pliable mesh by the one or more deformable members allows for a gentle and gradual transference of the bird's kinetic energy to the one or more weighted masses by absorbing and dispersing the kinetic energy to decelerate the bird safely and rebound the bird away from the window without making contact with the window. In at least one embodiment, utilizing the one or more deformable members to attach the one or more weighted masses to the pliable mesh creates a dynamic system, so that when a bird strikes the pliable mesh, the impact causes the one or more deformable members to temporarily elongate and cause the deceleration of the bird to be less sudden. In many embodiments, as the bird is impacting the pliable mesh and causing the one or more deformable members to elongate, the one or more weighted masses provide an opposite horizontal force that the bird is pushing against, which causes the deceleration of the bird. In certain embodiments, as the system causes the bird to decelerate, the one or more deformable members may rebound back to the unelongated state, which may cause the pliable mesh to pull back towards the one or more weighted masses, which causes additional deceleration of the bird.

In several embodiments, the one or more weighted masses may be any device having a mass. In at least one embodiment, the one or more weighted masses may be bags that are filled with material, such as sand, pea gravel, or other similar material. In certain embodiments, the weight of the one or more weighted masses may be adjustable. For example, in one embodiment, if the one or more weighted masses are bags filled with material, the bags may be opened so that material may be added or removed from the bags, to change the weight of the bag. In some embodiments, depending on the type of birds that live in the geographic region, a user may adjust the weight of the weighted material to accommodate those types of birds. For example, in one embodiment, a large city may have mostly smaller birds living in the city, and so the weight of the weighted masses for systems installed in the large city may be lighter than systems installed in rural areas. In certain embodiments, the combined weight of the weighted masses may be in the range of five pounds to 50 pounds. In a preferred embodiment, the combined weight of the one or more weighted masses may be 10 pounds to 25 pounds.

Referring now to the figures, for the purposes of example and explanation of the fundamental processes and components of the disclosed systems and methods, reference is made to FIG. 1, which illustrates an exemplary, bird impact mitigation system 100. As will be understood and appreciated, the exemplary, bird impact mitigation system 100 shown in FIG. 1 represents merely one approach or embodiment of the present system, and other aspects are used according to various embodiments of the present system.

In various embodiments, the bird impact mitigation system 100 may include a vertical expanse of a pliable mesh 110 having an upper side edge 110u and a lower side edge 110l opposite the upper side edge 110u that is disposed vertically in front of, and generally parallel to, a window or structure presenting an impact hazard to birds. In several embodiments, the pliable mesh 110 also includes two side edges 110s opposite each other that connect the upper side edge 110u and the lower side edge 110l. For example, the lower side edge 110l and may be connected to and extend integrally from each of the two side edges 110s such that a first of the side edges 110s and the lower side edge 110l define a first corner, and a second of the side edges 110s and the lower side edge 110l define a second corner opposite the first corner. Further, the upper side edge 110u and may be connected to and extend integrally from each of the two side edges 110s such that a first of the side edges 110s and the upper side edge 110u define a third corner, and a second of the side edges 110s and the upper side edge 110u define a fourth corner opposite the third corner. The upper side edge 110*u*, the lower side edge 110*l*, and the side edges 110*s* may cooperate to define a main expanse of the pliable mesh 110. The main expanse of the pliable mesh 110 may be, or include, a continuous, or generally uninterrupted run of the vinyl coated polyester yarn or other material that is used to form the pliable mesh 110. For example, the main expanse of pliable mesh 110 may be a generally rectangular span of the vinyl coated polyester yarn or other material that extends between each corner of the mesh 110. In some embodiments, at least two tarp clamps 140, anchors 902, or grommets (or other connection device that has defined an opening that the deformable member 130 may attach onto) are located in the top corners of the mesh 110 that enable two chains 170 to fasten to the mesh 110. In certain embodiments, one chain 170 is fastened or connected to each tarp clamp 140 at a first end of the chain 170, and a second end of the chain 170 is connected to a first end of a deformable member 130. In one or more embodiments, each deformable member 130 attached to a chain 170 is attached at a second end of the deformable member 130 to the building. In some embodiments, the lateral expanse of a pliable mesh 110 is spaced apart from the window or structure 10 by at least about 10-18 inches.

In at least one embodiment, one or more weighted masses 120 may be suspended via one or more deformable members 130 from a portion of the lower side edge 110*l*. For example, a first of the deformable members 130 may be coupled with a first corner of the pliable mesh 110 and extending away therefrom such that weighted mass 120 may be coupled to the pliable mesh 110 via the first of the deformable members 130 at the first corner. As further shown in FIG. 1, multiple weighted masses may be used. For example, a second of the deformable members 130 may be coupled with a second corner or the pliable mesh 110 and extending away therefrom such that another weight mass may be coupled to the pliable mesh 110 via the second of the deformable members 130 at the second corner. As shown in the FIG. 1, the one or more weighted masses 120 may preferably be sandbags 121, though it will be understood that any weighted mass that may be hung and have its weight adjusted is included in this disclosure. In many embodiments, the points of attachment of the weighted masses 120 and the deformable members 130 are preferably proximal to each lower corner of the pliable mesh 110, that is adjacent the intersection of sides 110*s* and lower side edges 110*l*. The weighted masses 120 may be suspended from the pliable mesh 110 (via the deformable members 130) and spaced apart or separated from a ground surface. For example, the weighted masses 120 may define floating anchors that are fully supported via the respective weighted masses connection to the pliable mesh 110.

As shown in FIG. 1, the pliable mesh 110 substantially covers the windows. For example, the pliable mesh 110 may be suspended relative to a window such that main expanse of pliable mesh is arranged parallel to and offset from a transparent pane of the window. In such arrangement, the pliable mesh 110 may visually obscure the transparent pane of the window. The pliable mesh 110 may therefore prevent a bird from observing its reflection or otherwise viewing the transparent pane as open space. The pliable mesh 100 cooperates with the deformable members 130 and weighted masses 120 to limit movement of the main expanse toward the transparent pane. For example, in the event that a bird flies into the system 100, the mesh 110 will initially move towards the window, in the direction the bird was flying. The kinetic energy of the bird is transferred to the one or more deformable members 130 and to the one or more weighted masses 120, causing the one or more deformable members to temporarily elongate, and then rebound, causing the gentle and gradual deceleration of the bird. In this regard, the deformable members 130 are configured to absorb momentum of the bird that is transferred to the main expanse via the impact from the bird. In several embodiments, by disposing the lateral expanse of a pliable mesh 110 by at least about 10-18 inches spaced apart from the window or structure, the combined resistance of movement from the one or more elastically deformable members 130 and the inertia required to displace the weighted mass is 120 is generally sufficient to substantially deaccelerate a bird moving at a speed of up to 45 mph and having a mass less than about 14 ounces before it would hit the window. In one embodiment, the 14-ounce mass provides a safety margin, as any most small- and medium-sized birds only weigh about 6 ounces.

In several embodiments, the system 100 may prevent an object sized at 14-16 ounces and having a velocity of 35-45 mph from touching the window, or only slightly touch the glass so that the glass does not visually flex (at 14 oz or more). In many embodiments, the energy is efficiently absorbed on the initial impact of the bird with the mesh 110 by the extension of the elastically deformable members 130, then as the pliable mesh 110 and the deformable members 130 reach their elastic limits, and further extension takes much greater force, the inertia of the mesh 110 must be transferred to the hanging weights 120.

In multiple embodiments, for windows ranging in size from about 2 to 8 ft., each weighted mass 120 preferably weighs about 7 to 8 pounds (3 to 4 kilograms). In one or more embodiments, weighted mass 120 attached to the pliable mesh 110 will pre-extend the deformable members 130. In many embodiments, the one or more weighted masses 120 are preferably bags 121 filled with sand or any sort of pliable container, preferably containing a non-toxic substance that will not decay or leach on exposure to sunlight, rain, snow or expansion and contraction due to changing weather conditions. In at least one embodiment, it is possible to deploy metal balls (shot or ball bearings like some soft sided dive weights) as well as PVC pipe filled with metal and coated with padding, such as foam rubber, these are less preferred for one or more reasons. In certain embodiments, the sandbags 121 may weigh from about 7-8 pounds each, such that when two bags 121 are used there is about 14-16 lbs. total of ballast as weighted mass. In one embodiment, the mass may be reduced for small windows 10 or using multiple bags 121, and the mass may be increased as windows are of large widths and heights. The weighted masses 120 provide several advantages, including minimizing movement of the pliable mesh 110 in high wind conditions. In many embodiments, the system 100 deploys filled sandbags 121 (for weighted mass and easily adjustable gravity based tensioning) as the one or more weighted masses 120 which are combined with the one or more deformable members 130 to allow a gentle and gradual transference of the bird's kinetic energy to the sandbags, to absorb and disperse enough of that energy to decelerate them safely and gently rebound them away from the glass without making contact.

In one or more embodiments, preferably that each deformable member 130 of the pair has a modulus of at least about 0.85 to 2 kg/cm, but more preferably about 1.1 to 1.7 kg/cm and most preferably about 1.2 to 1.5 kg/cm. In some embodiments, when more than two elastic members 130 are attached to the pliable mesh 110, the modulus of each member may be reduced to a lower value provided the modulus acting in parallel is at least about 1.7 to 3.9 kg/cm, but more preferably about 2.2 to 3.1 kg/cm and most preferably about 2.5 to about 3.1 kg/cm.

Figure 2:
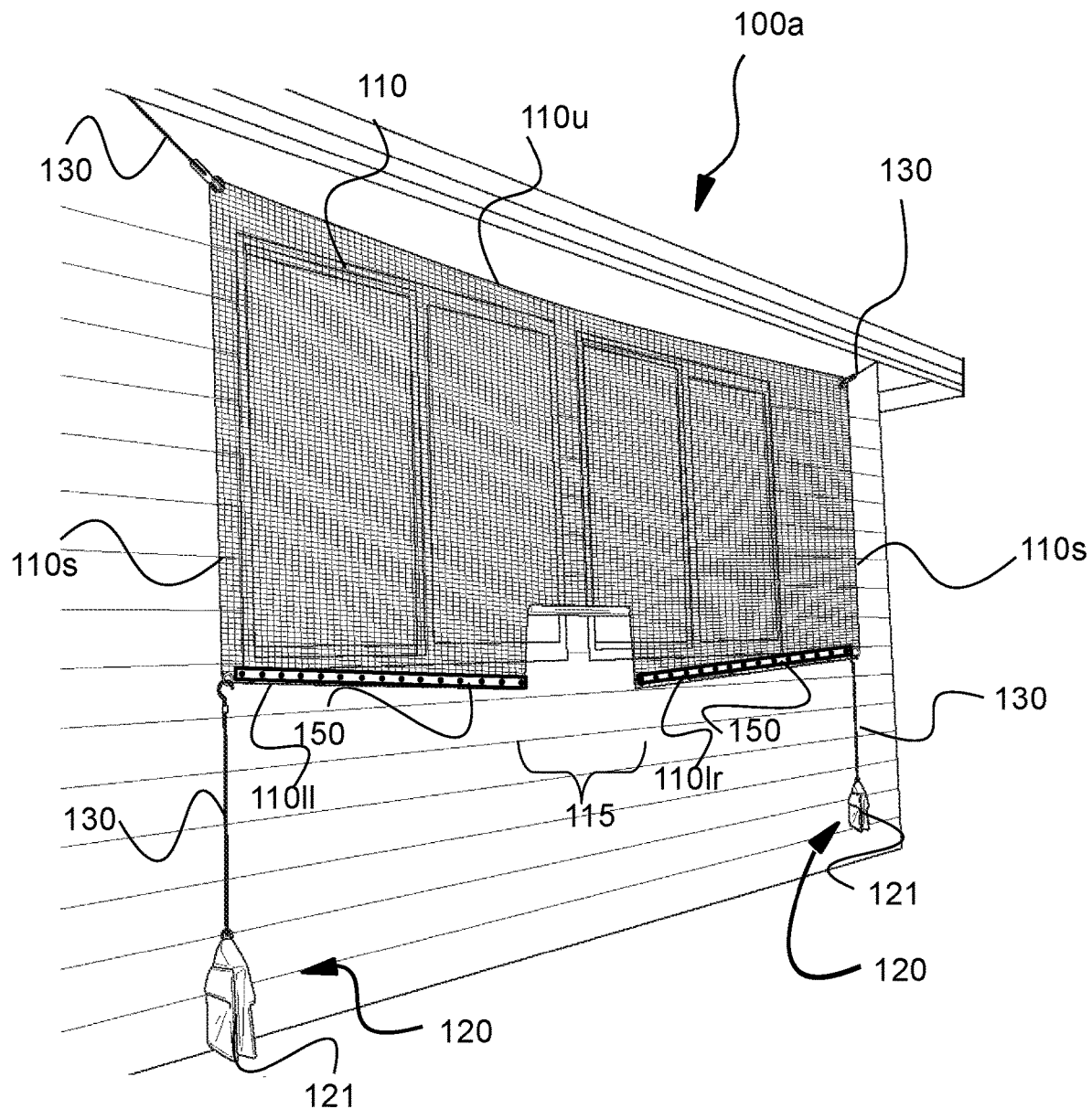
FIG. 2 illustrates a perspective view of an exemplary bird impact mitigation system, according to one embodiment of the present disclosure.

Turning now to FIG. 2, an alternative embodiment of the bird impact mitigation system 100a is shown, according to one embodiment of the present disclosure. As shown in FIG. 2, in several embodiments, the system 100a includes the pliable mesh 110 that includes a cut out 115 on the lower portion of the mesh 110 at the center of the lower side edge 110l. Additionally, as shown in the embodiment of FIG. 2, two plastic bars 150 are disposed on opposing lower edges 1101r and 11011 that surround a lower rectangular cut out 115 in the pliable mesh 110. In some embodiments, the rectangular cut out 115 may allow for heavy winds to pass under and through the mesh 110 more effectively, so to minimize any movement by the system 100a. In at least one embodiment, the deformable members 130 are attached to the pliable mesh 110 via reinforced grommet holes at the corners, but in a net or pliable mesh without grommet holes, the one or more deformable members 130 are preferably attached to tarp clamps 140. In some embodiments, the lower edge 110l of the pliable mesh 110 is coupled to the weighted mass 120 directly or via elastically deformable member 130 at either the tarp clamp 140 and/or plastic bars 150. In one embodiment, by attaching the one or more weighted masses to the one or more plastic bars, the load of the weighted masses 120 is more uniformly spread out.

As further shown in FIG. 2, the system 100 may be coupled to a structure via one or more additional deformable members 130. For example, and with continued reference to the components of FIG. 1, a third deformable member 130 may be coupled with a third corner of the pliable mesh 110 and extending away therefrom such that the pliable mesh 110 may be coupled to a structure (such as wall or roof feature of a building) via the third deformable member 130 at the third corner. As further shown in FIG. 2, a fourth deformable member 130 may be coupled with a fourth corner or the pliable mesh 110 and extending away therefrom such that the pliable mesh 110 may be coupled to the structure (such as wall or roof feature of a building) via the fourth deformable member 130 at the fourth corner. In this regard, the weight of the system 100 (including the weight of weighted masses 120) may be fully supported and suspend from the structure.

In multiple embodiments, the plastic bars 150 may be made of any suitable tough impact resistant and weatherproof material with a cross-sectional size of about ½ inch by ¼ inch, though the cross-sectional size may be larger or smaller depending on the needs of the system 100, and at a length commensurate with the pliable mesh 110 dimensions. In a preferred embodiment, the plastic bars 150 are made of ultrahigh molecular weight polyethylene to provide impact resistance and avoiding abrasive damage to the window or the building when the system 100 is wind driven.

However, in various embodiments, any form of plastic bars 150 may be used, and may be connected to the pliable mesh 110 by various forms of plastic push in rivets 190 with a shaft 191 that extends from the rivet head 195 through the mesh 110 to enter a hole 151 in the plastic bar 150, and secure thereto via either a projecting detent 192 when the shaft 191 is split, or deformation of pliable flanges 193 that extend annularly around the shaft 191, and spring outward to resist being pulled in after they exist the hole 151 (as shown in FIGS. 4C and 4D). In an alternative embodiment, plastic nuts and screws may be used in place of rivets 190, or a plastic rivet may have the shaft end 191d melted and flattened on the portion that extends beyond the hole 151, such as by ultrasonic melding. In many embodiments, the shaft 191 or the plastic rivet 190 may also connect to a plastic grommet, and the like.

Figure 3A:
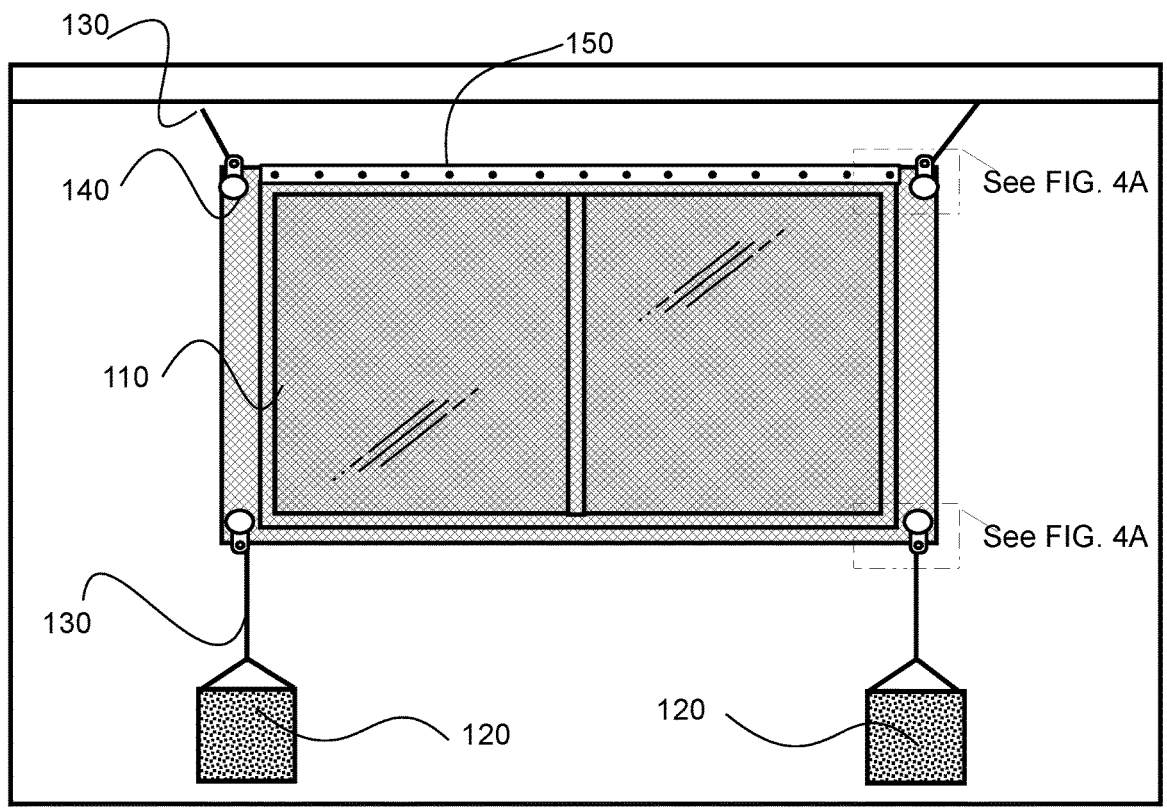
FIG. 3A illustrates a front view of an exemplary bird impact mitigation system, according to one embodiment of the present disclosure.

Turning now to FIG. 3A, a front view of the system 100 is shown, according to one embodiment of the present disclosure. As shown in FIG. 3A, one or more plastic bars 150 may also be deployed along the upper edge 110u of the pliable mesh to provide stiffness so as to prevent both sagging in the middle of the pliable mesh 110, as well as the pliable mesh folding around a bird. In some embodiments, plastic bar 150, as illustrated in FIG. 3A, may be preferably utilized when the window length is greater than about 8-10 ft horizontally or vertically to avoid a momentary collapsing effect of the mesh 110 toward the center before the material transfers significant energy to the suspension system to decelerate the bird (a delay or lag that may be mitigated by using the plastic bar 150 to restore the reaction time of the energy transfer). In some embodiments, the upper side edge 110u is coupled to the elastically deformable member 130 via one of tarp clamp 140 and/or plastic bars 150 (to spread the load). In many embodiments, the plastic bars 150 can also be used to improve the aesthetics if "sag" in the mesh 110 is undesirable. In at least one embodiment, plastic bars 150 may also be deployed at the sides 110s (as shown in FIG. 6) and bottom 110l (as shown in FIG. 2) of the pliable mesh 110 to accommodate external features of the building, such as doors with glass panels, sliding windows or French doors.

Figure 3B:
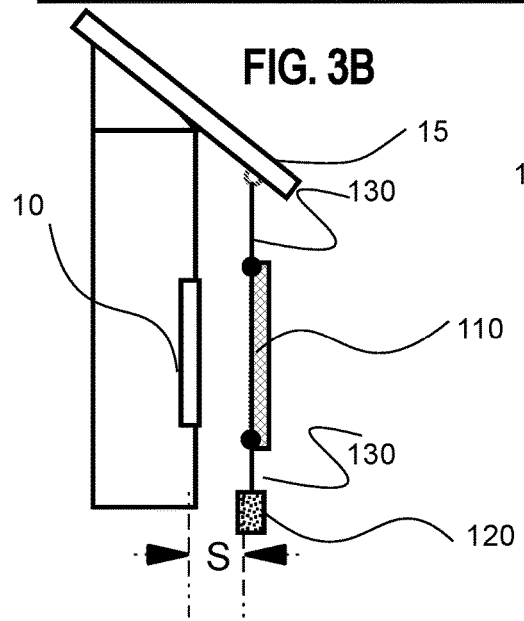
FIG. 3B illustrates a side view of an exemplary bird impact mitigation system, according to one embodiment, of the present disclosure.
Figure 3C:
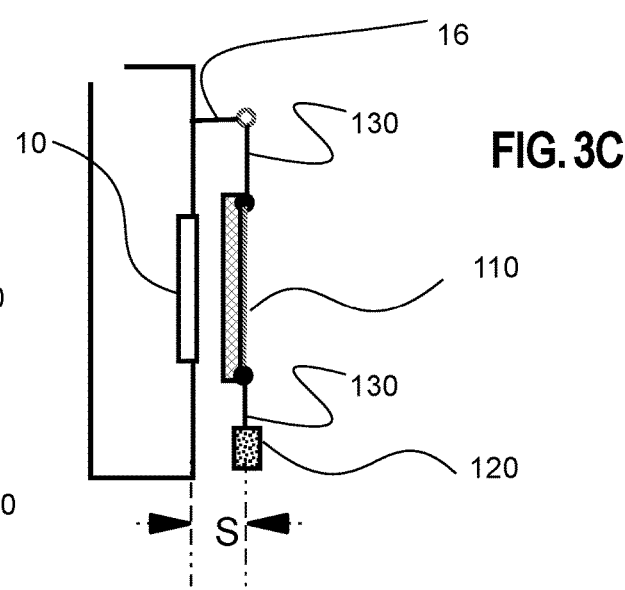
FIG. 3C illustrates a side view of an exemplary bird impact mitigation system, according to one embodiment of the present disclosure.

Turning now to FIGS. 3B and 3C, side views of the system 100 connected to different building structures are shown, according to embodiments of the present disclosure. In various embodiments, as shown in FIG. 3B, the spacing, S, from window 10 may be achieved by attaching the deformable members 130 to the underside of an overhanding roof 15. In several embodiments, as shown in FIG. 3C, the deformable member 130 is attached to an armature 16 that projects laterally from the wall of the house or structure over the window 10.

Figure 5:
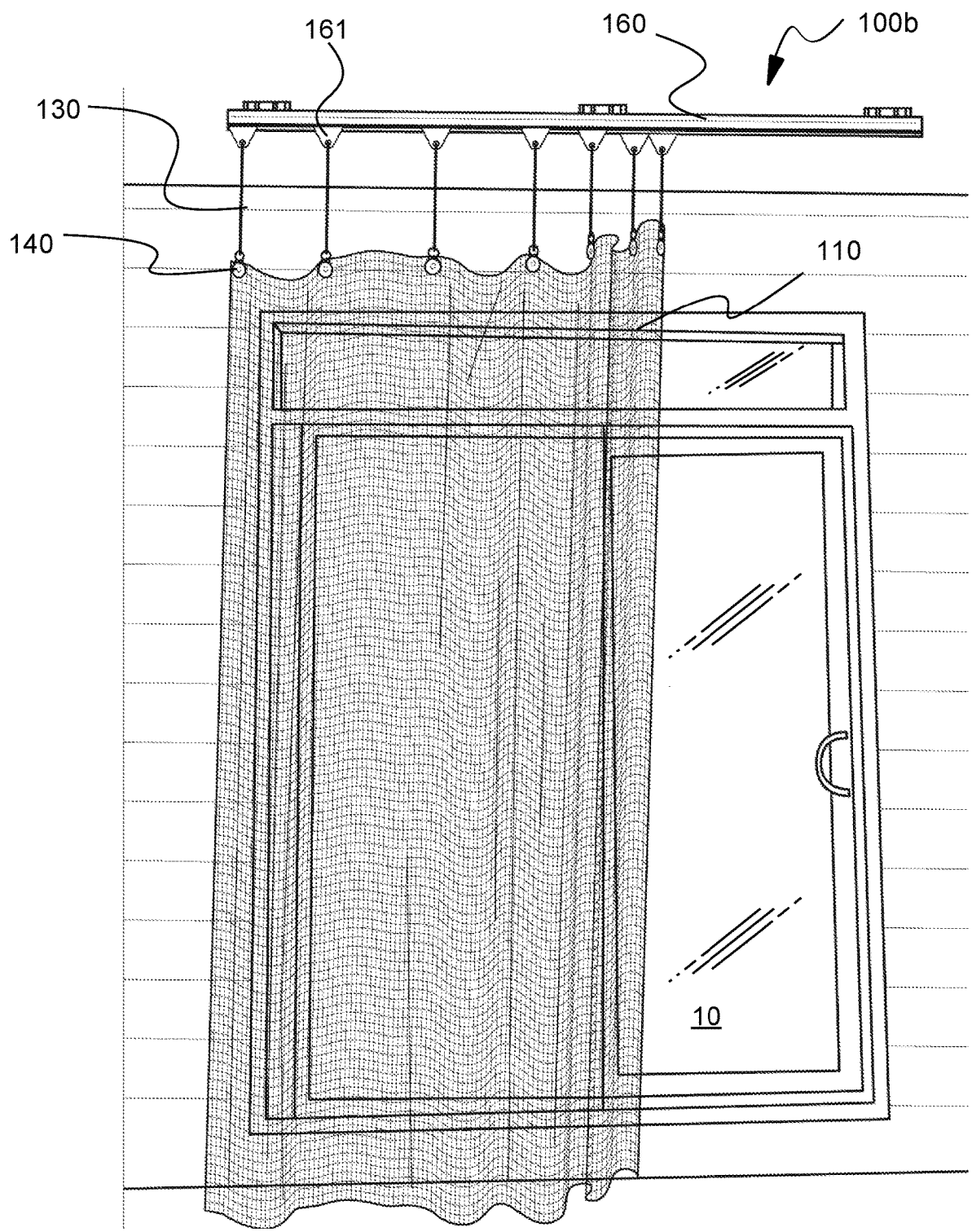
FIG. 5 illustrates a perspective view of another exemplary bird impact mitigation system, according to one embodiment of the present disclosure.
Figure 6:
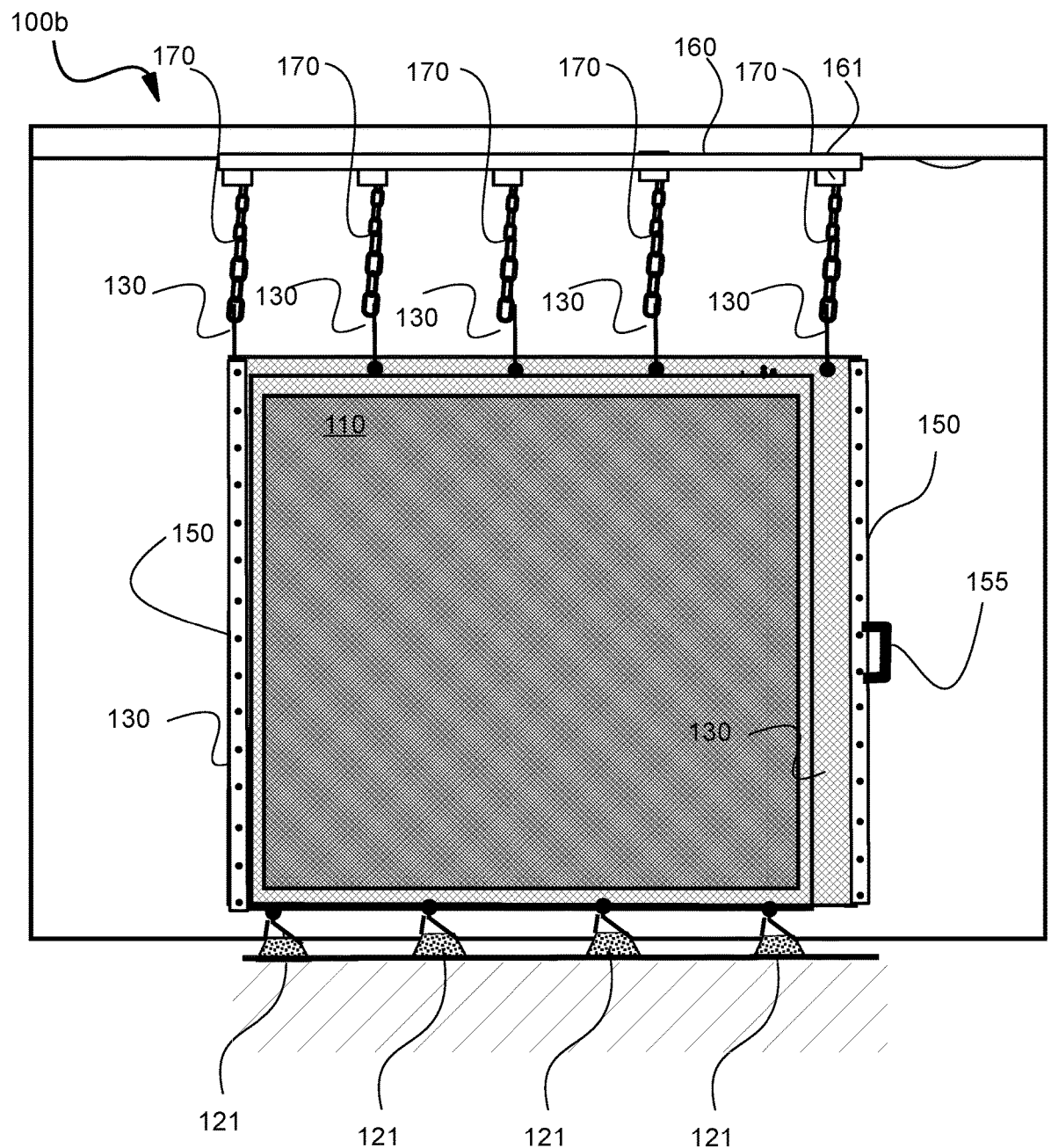
FIG. 6 illustrates a front view of another exemplary bird impact mitigation system, according to one embodiment of the present disclosure.

Turning now to FIGS. 5 and 6, front views of an alternative system 100b are shown, according to one embodiment of the present disclosure. In various embodiments, as shown in FIGS. 5 and 6, the system 100b includes a mesh 110 that covers a window 10, and also includes elastically deformable members 130 coupled to shuttles 161 mounted in track 160. In one or more embodiments, track 160 may be a linear inverted track or a curvilinear inverted track. In many embodiments, the track 160 allows the pliable mesh 110 to be pulled to one or both sides to allow egress and entry to a building via glass door, such as sliding doors, French doors and the like. In at least one embodiment, as shown in FIG. 6, the pliable mesh 110 may have a handle 155 attached to the side 110s via, for example, a flattened baton, such as a lightweight plastic bar 150 that extends vertically along each opposing side 110s. In certain embodiments, the mesh 110 may include one or more plastic bars along the sides 110s to provide more structure when pulling the mesh 110 to the side. In some embodiments, the lightweight plastic bar 150 generally extends along a substantial portion of side 110s that is at least about 80% of the pliable mesh 110, permits egress by advancing the pliable mesh 110 in the overhead track 160 via the handle 155. In several embodiments, the plastic bars 150 along the opposing sides 110s also prevent the pliable mesh 110 from collapsing around birds and thus transfer the force of impact to the elastically deformable members 130. In some embodiments, the system 100b may also include deformable members 130 connected to chains 170 that connect to the shuttles 161, as shown in FIG. 6, and may also include one or more sandbags 121 attached to the bottom portion of the mesh 110 and suspended in the air.

In many embodiments, the plastic bars 150, utilized as shown in in FIG. 6, may allow the sandbags 121 attached to the bottom of the mesh 110 to be optional, or may allow the sandbags 121, the pliable mesh 110 itself or other members to be lighter. In one alternative embodiment, the sandbags 121 may rest on the floor to provide resistive friction to the initial collapse of the pliable mesh 110 due to the structure the plastic bars 150 provides. In another alternative embodiment, a bottom portion of the pliable mesh 110 may contact the ground, with no weighted masses attached to the mesh 110, and the friction of the mesh 110 dragging on the ground may be sufficient to disperse kinetic energy not absorbed above by the larger plurality of deformable members 130 connected to the shuttles 161.

In various embodiments, the elastic member 130 are intended to have a limited pre-stretch from the mass of the mesh 110 and the weighted members 120, and the distal end 130d (as shown in FIG. 7) is preferably connected to a supporting structure of the building or other protected structure via stainless steel chains 170. In some embodiments, the end of the stainless-steel chain 170 may be connected to the eaves, roof edge or deck on the building via hooks or screws, or D rings 210. In many embodiments, the stainless-steel chain 170 is cut or shortened to align the pliable mesh 110 to completely cover and surround the window 10 glazing.

As shown in FIGS. 7A and 7B, an alternative sandbag 121a is shown, according to one embodiment of the present disclosure. As shown in FIG. 7, the sandbag 121a has a cylindrical body 702 and includes a zipper 706 for opening and closing the lid 704 of the sandbag to add material or remove material from the sandbag 121a, in order to adjust the weight of the sandbag 121a. As shown in FIG. 7A, the lid 704 is open, and as shown in FIG. 7B, the lid 704 is closed. In several embodiments, the sandbags 121 may attach to the deformable members 130, as shown in FIG. 7A, and the weighted mass 120 had several advantages because the combination of the sandbags 121 or sandbags 121a and the deformable members 130 do not generally touch the building or windows, and does not leave marks thereon, as well as other residues on a deck or walkways. In many embodiments, the sandbags 121 and 121a also avoid rust from steel shot or ball bearings, as well as the potential for toxic lead runoff for lead weights or shot.

In multiple embodiments, the sandbag 121a may have horizontal straps 708 connected to the outer cylindrical body 702. In some embodiments, as shown in FIG. 7B, the horizontal straps 708 may be connected to one end of a deformable member 130 that connects at the other end to the pliable mesh 110. As shown in FIG. 7A, in certain embodiments, the deformable member 130 may split at split point 710 into two or more split ends 712 that are attached to the cylindrical body 702 via sewing, connection devices, or other fastening techniques.

In many embodiments, the sandbags 121a may be opened by unzipping the zipper 706 and pulling open the lid 704. In at least one embodiment, material, such as sand, pea gravel, or any other filler material may be added into the hollow cylindrical body 702 until the sandbag 121a reaches a desired weight. In some embodiments, the lid 704 may then be zipped up by pulling the zipper 706 closed. Though a zipper 706 is shown in FIGS. 7A and 7B, it will be understood that other connection devices that allow for the opening and closing of the lid 704 may be utilized, such as hook and loop fasteners and other similar devices.

Figure 8:
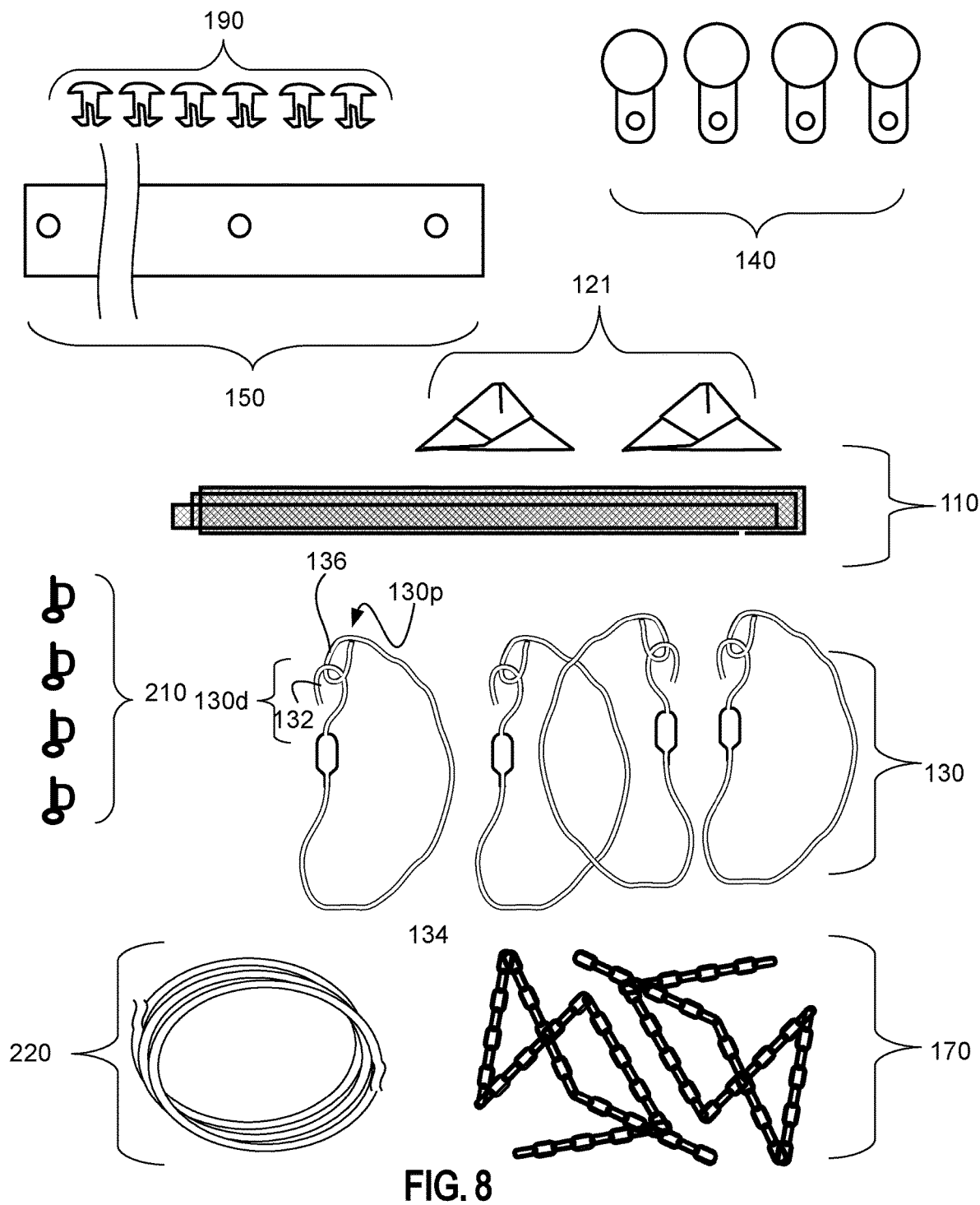
FIG. 8 illustrates an exemplary kit of components for installing various embodiments of the bird impact mitigation system, according to one embodiment of the present disclosure.

Turning now to FIG. 8, the components of a kit for assembling the system 100 is shown, according to one embodiment of the present disclosure. In several embodiments, the kit may include a pliable mesh 110, one or more sandbags 121, one or more deformable members 130, one or more tarp clamps 140, one or more plastic bars 150, one or more chains 170, one or more rivets 190, a series of "D" ring style couplings 210, or the like, for connecting the chains 170 or elastic members 130 to the building. In one embodiment, the kit may include extra cord 220 and/or a funnel for filling the sandbags 121 with material. In certain embodiments, the kit may also include one or more eye hooks or other similar device and/or one or more brackets for attaching to the building, along with any screws, bolts, or other fasteners needed to attach the one or more brackets or other similar devices to the building (none shown in FIG. 8). In one or more embodiments, the chains 170 may be used to connect the deformable members 130 to the building, as they are easy to adjust in length and will be positioned well above the windows to avoid impact in high winds or other conditions. In a preferred embodiment, any hardware utilized in the system 100, including D-rings 210 mounting brackets, eye bolts, screws, chains 170, anchors, connection devices, or other hardware, is made of stainless steel (though other materials may be used in other embodiments).

Figure 9A:
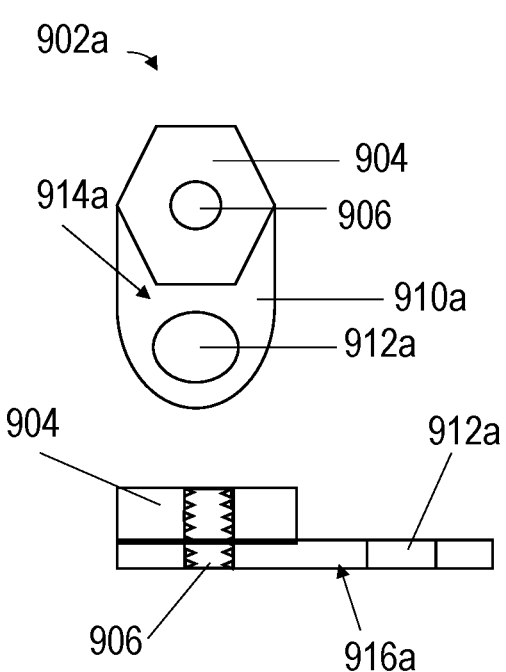
FIG. 9A illustrates an exemplary nut-side 902a of an exemplary anchor 902, according to one embodiment of the present disclosure.
Figure 9B:
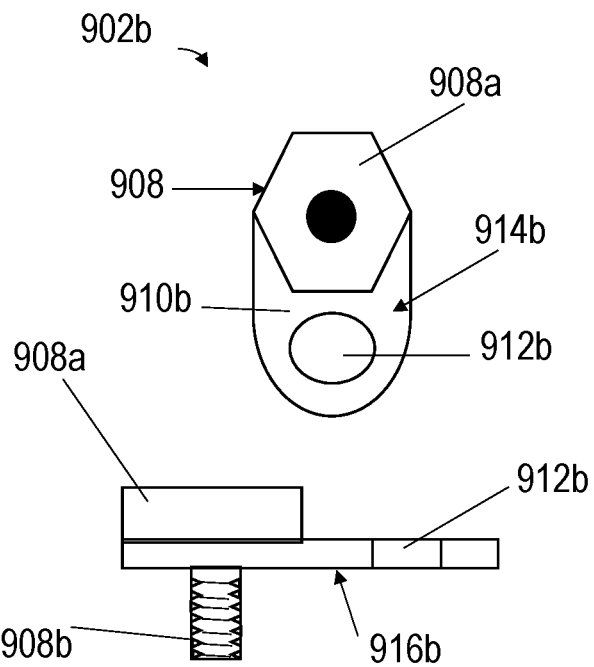
FIG. 9B illustrates a front view and a side view of an exemplary bolt side 902b of an exemplary anchor 902, according to one embodiment of the present disclosure.
Figure 9C:
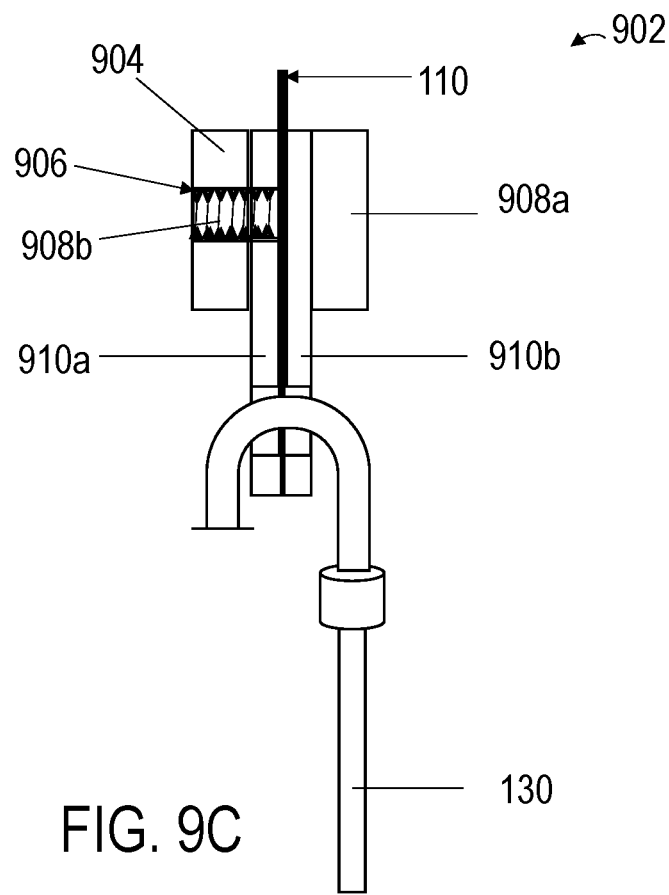
FIG. 9C illustrates a side view of an exemplary anchor 902, according to one embodiment of the present disclosure.

Turning now to FIGS. 9A, 9B, and 9C, a side and front views of an exemplary anchor 902, exemplary nut-side 902a of anchor 902, and exemplary bolt-side 902b of anchor 902 are shown, according to one embodiment of the present disclosure. In multiple embodiments, the anchor 902 may be utilized in place of, or in addition to, the tarp clamps 140 to connect the one or more deformable members 130 to the pliable mesh 110. In one or more embodiments, the anchor 902 may be securely fastened to the pliable mesh 110 and include functionality that allows for a single deformable member 130 to connect to the anchor 902. In several embodiments, the anchor 902, including all individual parts of the anchor 902, may be made of stainless steel, carbon steel, nickel, aluminum, titanium, plastic, and/or any other similar material. In many embodiments, the anchor 902 includes a nut-side 902a and a bolt-side 902b. In at least one embodiment, the nut-side 902a may include a nut 904 that defines an opening 906 that includes screw threads on the inner wall of the opening 904, and the bolt-side 902b may include a bolt 908 having a bolt head 908a and a thread end 908b, wherein the thread end 908b has screw threads on its outer exterior. In multiple embodiments, the thread end 908 of the bolt 908 of the bolt-side 902b may be placed through an opening of the pliable mesh 110 and into the opening 906 of the nut 904 on the nut-side 902a, and the thread end 908b of the bolt 908 and opening 906 may be operatively connected via the opposing screw threads so that the pliable mesh 110 is secured in between the nut-side 902a and the bolt-side 902b.

In various embodiments, as shown in FIG. 9A, the nut-side 902a of the anchor 902 may include the nut 904 that defines the opening 906, a connection plate 910a that defines a first opening 912a and a second opening (not shown in the figures). In many embodiments, the connection plate 910a may include a flat front surface 914a and a flat back surface 916a. In certain embodiments, the connection plate 910a may be oval-shaped, circular, rectangular, square-shaped, or any other shape. In some embodiments, the first opening 912a may be generally circular or oval-shaped, or any other shape so that a hook end of the deformable member 130 can pass through the first opening 912a so that the deformable member 130 may be connected to the connection plate 910a, and thus, the nut-side 902a. In at least one embodiment, the second opening of the connection plate 910a may be generally circular or any other shape so that the thread end bolt 908 may pass through the second opening of the connection plate 910a.

In several embodiments, as shown in FIG. 9B, the bolt-side 902b may include a bolt 908 that includes a bolt head 908a and a thread end 908b, a connection plate 910b that defines a first opening 912b and a second opening (not shown in the figures). In many embodiments, the connection plate 910b may include a flat front surface 914b and a flat back surface 916b. In certain embodiments, the connection plate 910b may be oval-shaped, circular, rectangular, square-shaped, or any other shape. In some embodiments, the first opening 912b may be generally circular or oval-shaped, or any other shape so that a hook end of the deformable member 130 can pass through the first opening 912b so that the deformable member 130 may be connected to the connection plate 910b, and thus, the bolt-side 902b. In at least one embodiment, the second opening of the connection plate 910b may be generally circular or any other shape so that the thread end 908b of the bolt 908 may pass through the second opening of the connection plate 910a. In one or more embodiments, the connection plate 910a and the connection plate 910 may be identical or nearly identical so that when the connection plates 910a and 910b are placed such that the back surface 916a is lined up and in contact with the back surface 916b, the first opening 912a of the connection plate 910a and the first opening 912b of the connection plate 910b are aligned so that the hook end of the deformable member 130 may pass through both openings.

In multiple embodiments, as shown in FIG. 9C, the nut-side 902a and the bolt side 902b may align together so that the thread end of the bolt 908 may pass through the second opening of the connection plate 910b, the pliable mesh 110, the second opening of the connection plate 910a, and operatively connect to the screw threads on the interior wall of the opening 906 of the nut 904 so that the formed anchor 902 is operatively connected or fastened to the mesh 110. In many embodiments, once the nut-side 902a and the bolt-side 902b are connected to form the anchor 902, the openings 912a and 912b are aligned so that the hook end of the deformable member 130 (or other similar connection device) may pass through the openings to securely connect the deformable member 130 to the anchor 902. In at least one embodiment, the connection between the nut-side 902a and the bolt-side 902b may be strong enough so that the weighted mass 120 may be suspended from the other end of the deformable member 130 without the connection between the nut-side 902a and the bolt-side 902b breaking or otherwise deforming.

Figure 10:
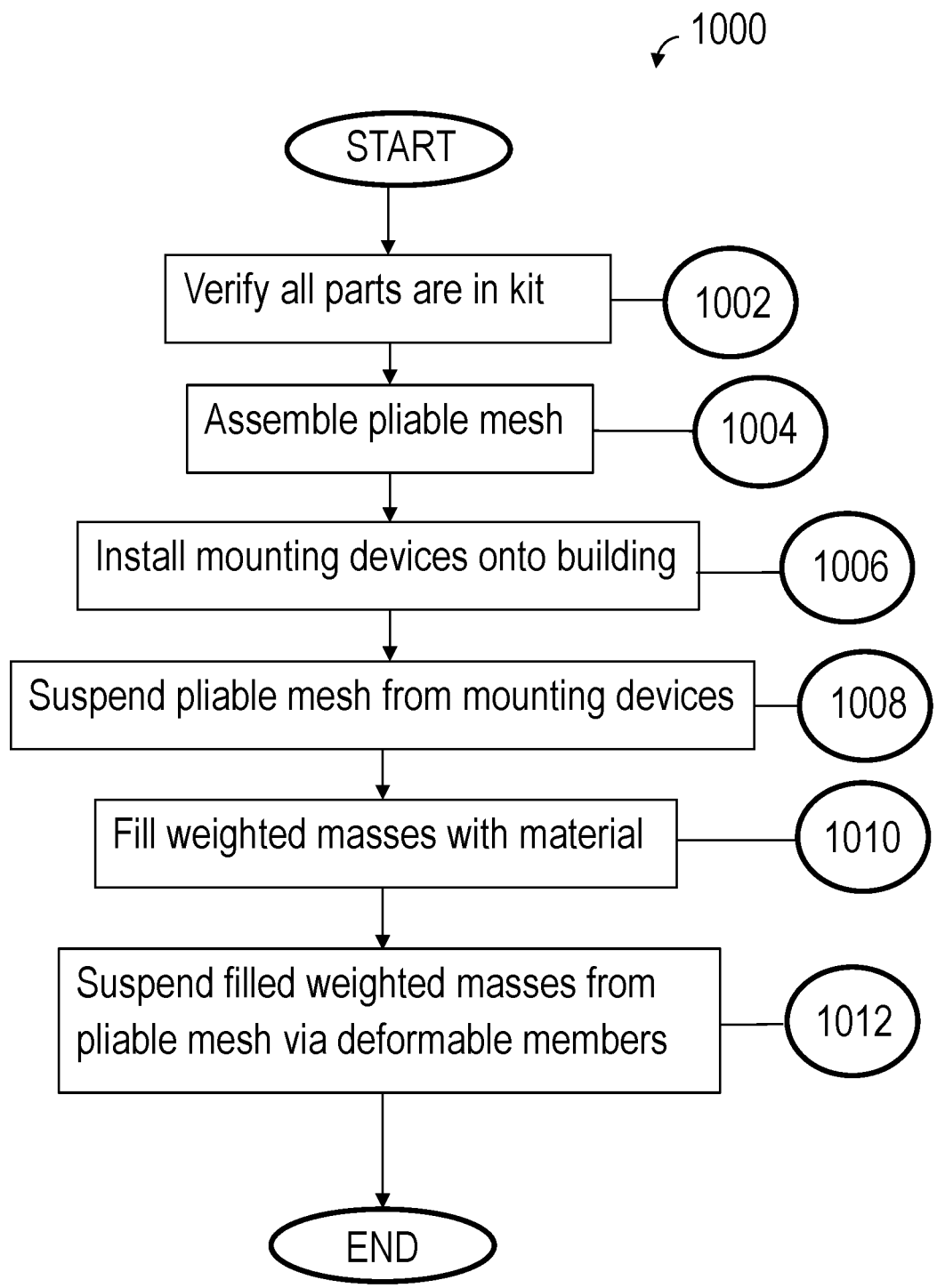
FIG. 10 describes a method of installation of system 100, according to one embodiment of the present disclosure.

Turning now to FIG. 10, a method of installation of system 100 is described, according to one embodiment of the present disclosure. In several embodiments, a user may install the system 100 on the side of the building in front of one or more windows. In one embodiment, the user may install the system 100 via parts included in the kit as described in connection with FIG. 8.

In various embodiments, at step 1002, a user may open the kit and confirm all parts are present within the kit by verifying that each component is present using the parts list provided.

At step 1004, the pliable mesh 110 may be assembled by attaching the tarp clamps 140 to each of the four corners of the pliable mesh 110, the four corners of the pliable mesh 110 defined as the intersection of the two opposing sides edges 110s with the upper side edge 110u and with the lower side edge 1101. In alternative embodiment, the pliable mesh 110 may be pre-assembled.

At step 1006, mounting devices, such as D-rings 210, eye bolts, or mounting brackets may be installed onto the building. In multiple embodiments, if the window to be covered by the system 100 is located under roof eaves, then the D-rings 210 or eye bolts, or other similar devices may be mounted onto roof eave trusses of the building so that the D-rings 210 or eye bolts or other similar devices are at least ten inches away from the window, so that the mesh 110 will be at least ten inches away horizontally from the window. In this embodiment, the eye bolts or D-rings 210 may be installed on trusses that are wider than the width of the one or more windows to be covered by the mesh 100 (i.e., the width between the installed D-rings 210 or eye bolts is wider than the width of the one or more covered windows). In a preferred embodiment, the D-rings 210 or eye bolts may be installed on roof eave trusses so that the width between the mounted eye bolts or D-rings 210 is about 2-4 feet wider than the width of the one or more covered windows.

Alternatively, in other embodiments, if the building does not have roof eaves, or if a user does not want to utilize the roof eave trusses as the connection point between the system 100 and the building, mounting brackets may be installed onto the wall of the building. In at least one embodiment, the mounting brackets may protrude out from the wall so that when the mesh 110 is hung from the mounting brackets, the mesh 110 is between 10-18 inches away from the one or more covered windows. In some embodiments, the mounting brackets may be installed so that the distance between the mounting brackets is 2-4 feet longer than the width of the one or more covered windows. In one embodiment, the mounting brackets may be installed 10-20 inches higher than the top edge of the one or more covered windows, and in a preferred embodiment, 15 inches above the top edge of the one or more covered windows.

At step 1008, in many embodiments, mesh 110 is hung on the installed D-rings 210, eye bolts, or mounting brackets. In several embodiments, a stainless-steel quick link may be attached to each of the D-rings 210, eye bolts, or mounting brackets, as applicable, and one end of a chain 170 may then be connected to each of the quick links. In at least one embodiment, one end of one deformable member 130 may be attached to the other end of each of the chains 170. In multiple embodiments, the other end of each deformable member 130 may be connected to the tarp clamps 140 that are attached at the top two corners of the mesh 110. In some embodiments, the height of the mesh 110 may be adjusted by changing which chain link of the chain 170 the deformable member is attached to. In one or more embodiments, if necessary, the mesh 110 may be raised to ensure that the upper side edge 110u of the mesh 110 is level and slightly above the top edge of the window frame by 2-3 inches. Mark which chain link is to be cut to remove the excess chain once the height has been correctly set.

At step 1010, in various embodiments, the weighted masses 120 may be filled with material so that each weighted mass 120 weighs between 8-10 pounds for protecting small to medium sized birds. In at least one embodiment, if trying to protect larger birds from window impacts, the weighted masses 120 may be filled with more material to increase the weight of the weighted masses 120.

At step 1012, in multiple embodiments, deformable member 130 may be attached at one end to the weighted mass 120 and at the other end to the tarp clamps 140 attached at the bottom two corners of the mesh 110. In some embodiments, deformable members 130 may have a first end that forms a hook, and a second end that is a loop (as seen in FIG. 8). In at least one embodiment, the weighted masses 120 may include a handle, so that the hook end of a deformable member 130 is attached to a tarp clamp 140, and the loop end of the deformable member 130 is passed through the handle of a weighted mass 120 and connected to the hook end of the deformable member.

CONCLUSION

Aspects, features, and benefits of the systems, methods, processes, formulations, apparatuses, and products discussed herein will become apparent from the information disclosed in the exhibits and the other applications as incorporated by reference. Variations and modifications to the disclosed systems and methods may be effected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the inventions to the precise forms disclosed. Many modifications and variations are possible in light of the above teaching.

The embodiments were chosen and described in order to explain the principles of the inventions and their practical application so as to enable others skilled in the art to utilize the inventions and various embodiments and with various modifications as are suited to the particular use contemplated. Alternative embodiments will become apparent to those skilled in the art to which the present inventions pertain without departing from their spirit and scope. Accordingly, the scope of the present inventions is defined by the appended claims rather than the foregoing description and the exemplary embodiments described therein.

While various aspects have been described in the context of a preferred embodiment, additional aspects, features, and methodologies of the claimed inventions will be readily discernible from the description herein, by those of ordinary skill in the art. Many embodiments and adaptations of the disclosure and claimed inventions other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed inventions. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed inventions. In addition, some steps may be carried out simultaneously, contemporaneously, or in synchronization with other steps.

The embodiments were chosen and described in order to explain the principles of the claimed inventions and their practical application so as to enable others skilled in the art to utilize the inventions and various embodiments and with various modifications as are suited to the particular use contemplated. Alternative embodiments will become apparent to those skilled in the art to which the claimed inventions pertain without departing from their spirit and scope. Accordingly, the scope of the claimed inventions is defined by the appended claims rather than the foregoing description and the exemplary embodiments described therein.

What is claimed is:

1. A system comprising:
   a pliable mesh having a main expanse and suspended relative to a window with the main expanse arranged parallel to and offset from a transparent pane of the window;
   a first deformable member coupled with a first corner of the pliable mesh and extending away from the main expanse;
   a first weighted mass suspended from the pliable mesh by the first deformable member;
   a second deformable member coupled with a second corner of the pliable mesh and extending away from the main expanse;
   a second weighted mass suspended from the pliable mesh opposite by the second deformable member;
   a third deformable member coupled with a third corner of the pliable mesh and extending away from the main expanse and fixed to a structure running along the window opposite a ground surface; and
   a fourth deformable member coupled with a fourth corner of the pliable mesh and extending away from the main expanse and fixed to the structure;
   wherein the main expanse of the pliable mesh is configured to receive an impact from a bird on a path toward the window;
   wherein the first weighted mass and the second weighted mass define floating anchors for each of the respective first deformable member and the second deformable member, opposite the main expanse,
   wherein the first weighted mass and the second weighted mass define a counterbalance to the impact from the bird cooperating with the main expanse to maintain at least some offset between the main expanse and the transparent pane during the impact from the bird,
   wherein each of the first, second, third, or fourth deformable members are formed from a bungee material, and
   wherein a lower edge of the pliable mesh is flexible and extends between the first corner and the second corner thereby permitting relative movement between said first corner and second corner.

2. The system of claim 1, wherein, in response to receiving the impact
   the main expanse moves toward the transparent pane; and
   the first weighted mass and the second weighted mass cooperate with the first deformable member and the second deformable member, respectively, to limit the movement of the main expanse toward the transparent pane.

3. The system of claim 2, wherein the first deformable member and the second deformable member are configured to absorb momentum of the bird transferred to the main expanse via the impact.

4. The system of claim 3, wherein each of the first deformable member, the second deformable member, the third deformable member, and the fourth deformable member are elastically deformable members configured to absorb the momentum of the bird gradually according to an elastic coefficient of the bungee material.

5. The system of claim 1, wherein
a weight of the first weighted mass is supported fully from the first deformable member; and
a weight of the second weighted mass is supported fully from the second deformable member.

6. The system of claim 1, wherein the structure comprises a wall, a frame, or sill of a residential or commercial structure.

7. The system of claim 6, wherein a weight of the system is fully supported and suspended from the structure.

8. The system of claim 6, wherein
the main expanse comprises a generally planar and rectangular shape; and
the first, second, third, and fourth corners are separate corners of the rectangular structure.

9. The system of claim 1, wherein the pliable mesh comprises a vinyl coated polyester yarn.

10. The system of claim 1, wherein the pliable mesh is configured to visually obscure the transparent pane of the window.

11. The system of claim 1, wherein the pliable mesh has an open area of no greater than about 30%.

12. The system of claim 1, wherein each of the first weighted mass and the second weighted mass weigh at least 7 lbs.

13. The system of claim 1, wherein each of the first weighted mass and the second weighted mass are arranged above and offset from a ground surface.

14. The system of claim 1, wherein the pliable mesh comprises a cut out defined along a lower side edge of the pliable mesh, the cut out being configured to allow for heaving winds to pass under the pliable mesh while minimizing movement of the system.

15. The system of claim 1, further comprising one or more armatures projecting from the structure and defining an anchor point for each of the third deformable member and the fourth deformable member offset from the window.

16. The system of claim 1, further comprising
a first tarp clamp coupling the third deformable member to the third corner of the pliable mesh, and
a second tarp clamp coupling the fourth deformable member to the fourth corner of the pliable mesh.

17. The system of claim 16, further comprising a plastic bar coupled with the pliable mesh along an upper side edge of the pliable mesh between the third corner and the fourth corner, wherein the plastic bar is configured to impart a greater rigidity along the upper side edge of the pliable mesh as compared to the rigidity of the pliable mesh along a lower side edge of the pliable mesh.

18. A kit comprising
a pliable mesh having a main expanse configured to be suspended relative to a window with the main expanse arranged parallel to and offset from a transparent pane of the window;
a first deformable member configured to be coupled with a first corner of the pliable mesh such that the first deformable member extends away from the main expanse;
a first weighted mass configured to be suspended from the pliable mesh by the first deformable member;
a second deformable member configured to be coupled with a second corner of the pliable mesh such that the second deformable member extends away from the main expanse;
a second weighted mass configured to be suspended from the pliable mesh opposite the second deformable member;
a third deformable member configured to be coupled with a third corner of the pliable mesh such that the third deformable member extends away from the main expanse, and further configured to be fixed to a structure running along the window opposite a ground surface;
a fourth deformable member configured to be coupled with a fourth corner of the pliable mesh such that the fourth deformable member extends away from the main expanse, and further configured to be fixed to the structure;
wherein the main expanse of the pliable mesh is configured to receive an impact from a bird on a path toward the window;
wherein the first weighted mass and the second weighted mass are configured to define floating anchors for each of the respective first deformable member and the second deformable member, opposite the main expanse,
wherein the first weighted mass and the second weighted mass are further configured to define a counterbalance to the impact from the bird cooperating with the main expanse to maintain at least some offset between the main expanse and the transparent pane during the impact from the bird,
wherein each of the first, second, third, or fourth deformable members are formed from a bungee material, and
wherein a lower edge of the pliable mesh is flexible and extends between the first corner and the second corner thereby permitting relative movement between said first corner and second corner in an installed configuration.

19. A method comprising:
suspending a pliable mesh from a structure such that a main expanse of the pliable mesh is arranged relative to a window with the main expanse parallel to and offset from a transparent pane of the window;
coupling a first deformable member with a first corner of the pliable mesh and allowing the first deformable member to extend away from the main expanse;
suspending a first weighted mass from the pliable mesh by the first deformable member;
coupling a second deformable member with a second corner of the pliable mesh and allowing the second deformable member to extend away from the main expanse;
suspending a second weighted mass from the pliable mesh by the second deformable member,
wherein suspending the pliable mesh further comprises
fixing a third deformable member to the structure and coupling the third deformable member with a third corner of the pliable mesh, opposite the structure, the third deformable member extending away from the pliable mesh, and
fixing a fourth deformable member to the structure and coupling the fourth deformable member with a fourth corner of the pliable mesh, opposite the structure, the fourth deformable member extending away from the pliable mesh, wherein the main expanse of the pliable mesh is configured to receive an impact from a bird on a path toward the window;

wherein the first weighted mass and the second weighted mass define floating anchors for each of the respective first deformable member and the second deformable member, opposite the main expanse, wherein the first weighted mass and the second weighted mass define a counterbalance to the impact from the bird cooperating with the main expanse to maintain at least some offset between the main expanse and the transparent pane during the impact from the bird, wherein each of the first, second, third, or fourth deformable members are formed from a bungee material, and wherein a lower edge of the pliable mesh is flexible and extends between the first corner and the second corner thereby permitting relative movement between said first corner and second corner.

* * * * *